(12) United States Patent
Kvist et al.

(10) Patent No.: US 12,272,880 B2
(45) Date of Patent: Apr. 8, 2025

(54) HEARING DEVICE WITH BEAM-STEERABLE ANTENNA ARRANGEMENT

(71) Applicant: GN Hearing A/S, Ballerup (DK)

(72) Inventors: Søren Helstrup Kvist, Værløse (DK); Alexandre Da Luz Pinto, Copenhagen (DK)

(73) Assignee: GN Hearing A/S, Ballerup (DK)

( * ) Notice: Subject to any disclaimer, the term of this patent is extended or adjusted under 35 U.S.C. 154(b) by 192 days.

(21) Appl. No.: 17/941,991

(22) Filed: Sep. 9, 2022

(65) Prior Publication Data

US 2023/0099549 A1 Mar. 30, 2023

(30) Foreign Application Priority Data

Sep. 22, 2021 (DK) .......................... PA 2021 70462

(51) Int. Cl.
*H04R 25/00* (2006.01)
*H01Q 1/27* (2006.01)
(Continued)

(52) U.S. Cl.
CPC .............. *H01Q 3/36* (2013.01); *H01Q 1/273* (2013.01); *H01Q 3/28* (2013.01); *H04R 25/554* (2013.01);
(Continued)

(58) Field of Classification Search
CPC .......... H04R 2225/025; H04R 2225/51; H04R 2225/61; H04R 25/554; H04R 25/604;
(Continued)

(56) References Cited

U.S. PATENT DOCUMENTS

2015/0131830 A1 5/2015 Pinto
2019/0027833 A1* 1/2019 Ayala Vazquez ...... H01Q 5/342

FOREIGN PATENT DOCUMENTS

DE 201 14461 10/2001
EP 2838210 A1 2/2015
(Continued)

OTHER PUBLICATIONS

1st Technical Examination for Danish Patent Appln. No. PA 2021 70462 dated Dec. 17, 2021.
(Continued)

*Primary Examiner* — Phylesha Dabney
(74) *Attorney, Agent, or Firm* — Vista IP Law Group, LLP

(57) ABSTRACT

A hearing device for placement in a user's ear includes: at least one input transducer, an output transducer, a wireless communication unit and an antenna arrangement adapted for providing a wireless link, and a reference axis, the reference axis being parallel to the user's ear-to-ear axis, when the hearing device is placed in an operable position, wherein in that the antenna arrangement comprises a first antenna configured for transmitting/receiving EM-radiation at a first frequency, the first antenna comprising a first electrically conducting segment extending in a first direction, a second antenna configured for transmitting/receiving EM-radiation at the first frequency, the second antenna comprising a second electrically conducting segment extending in a second direction, the second direction being different from the first direction, a first feed coupling the first antenna to the wireless communication unit, and a second feed coupling the second antenna to the wireless communication unit.

27 Claims, 7 Drawing Sheets

(51) Int. Cl.
*H01Q 3/28* (2006.01)
*H01Q 3/36* (2006.01)

(52) U.S. Cl.
CPC ......... *H04R 25/604* (2013.01); *H04R 25/609* (2019.05); *H04R 2225/025* (2013.01); *H04R 2225/51* (2013.01); *H04R 2225/61* (2013.01)

(58) Field of Classification Search
CPC ...... H04R 25/609; H01Q 1/273; H01Q 21/28; H01Q 3/28; H01Q 3/36
USPC ........................................................ 381/315
See application file for complete search history.

(56) References Cited

FOREIGN PATENT DOCUMENTS

| | | | |
|---|---|---|---|
| EP | 3122071 A1 | 1/2017 | |
| EP | 3220663 A1 | 9/2017 | |
| EP | 3413584 A1 | 12/2018 | |
| EP | 3849215 A1 | 7/2021 | |
| WO | WO-2016207215 A1 * | 12/2016 | ............. H04R 25/02 |

OTHER PUBLICATIONS

Extended European Search Report for EP Patent Appln. No. 21198521.3 dated Mar. 18, 2022.
Foreign Exam Communication for EP Patent Appln. No. 21198521.3 dated Feb. 19, 2025.

* cited by examiner

HEARING DEVICE WITH BEAM-STEERABLE ANTENNA ARRANGEMENT

RELATED APPLICATION DATA

This application claims priority to, and the benefit of, Danish Patent Application No. PA 2021 70462 filed on Sep. 22, 2021. The entire disclosure of the above application is expressly incorporated by reference herein.

FIELD

The present disclosure relates to a hearing device with a beam-steerable antenna arrangement.

BACKGROUND

Hearing devices, such as hearing aids and/or earbuds, are miniature devices adapted for at least partially being arranged in the ear of the user, i.e., at least a part of the hearing device is adapted for being placed in the ear canal of the user and/or at least a part of the hearing device is adapted for being placed in the concha of the user when the hearing device is placed in its operable position. The field of hearing devices have seen significant improvements to the wireless functionality. Whether it be wireless binaural communication with another hearing device, i.e., at the user's opposite ear, or wireless communication with an accessory device, such as a smart phone, hearing devices are receiving and transmitting increased amounts of information from/to external devices. However, hearing devices are still miniature devices, and thus it is difficult to provide them with antennas capable of providing the wireless link quality found in other electronic devices. Thus, there is still a need for improved wireless capabilities in hearing devices.

SUMMARY

When establishing a wireless link with an external device, the path of the wireless signal is a major factor in the quality of the link. Particularly, for on-body communication, i.e., wireless communication between the hearing device located at one of the user's ears and another device located somewhere else on their body, the path may be unpredictable as all users have unique body shapes and habits when carrying their accessory devices, e.g., front/back and left/right pocket. It is therefore difficult to provide an antenna capable of providing optimal wireless performance for all users.

Accordingly, there is a need for a hearing device with improved antenna versatility, which can adapt to the wireless signal path of a given situation.

A hearing device for placement in a user's ear is disclosed, the hearing device comprising at least one input transducer, an output transducer, a wireless communication unit and an antenna arrangement adapted for providing a wireless link, and a reference axis, the reference axis being parallel to the user's ear-to-ear axis, when the hearing device is placed in an operable position, wherein the antenna arrangement comprises a first antenna configured for transmitting/receiving EM-radiation at a first frequency, the first antenna comprising a first electrically conducting segment extending in a first direction, a second antenna configured for transmitting/receiving EM-radiation at the first frequency, the second antenna comprising a second electrically conducting segment extending in a second direction, the second direction being different from the first direction, a first feed coupling the first antenna to the wireless communication unit, and a second feed coupling the second antenna to the wireless communication unit.

It is an advantage of such a hearing device that the antenna arrangement comprises two antennas configured for wireless communication at the same frequency, and with different directionality, so that the hearing device has at least two possible signal paths to switch between.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
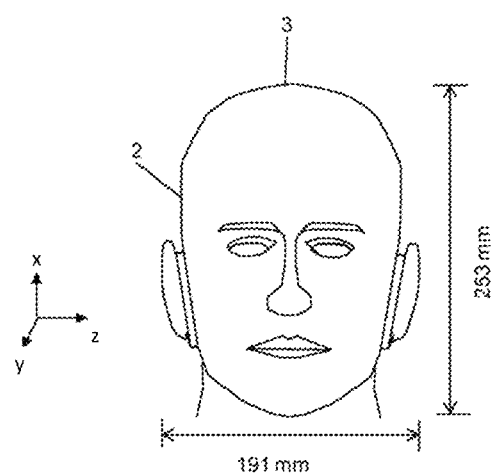
FIG. 1 schematically illustrates a phantom head model of a user, and a three-dimensional coordinate system with an x, y, and z axis.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device is configured to be worn at an ear of a user and may be a hearable, such as an ear bud, or a hearing aid. The hearing device may be a hearing aid of the behind-the-ear (BTE) type, in-the-ear (ITE) type, in-the-canal (ITC) type, receiver-in-canal (RIC) type, receiver-in-the-ear (RITE) type or completely in the canal (CIC) type. The hearing aid may be a binaural hearing aid. The binaural hearing aid may comprise a first earpiece and a second earpiece, wherein the first earpiece and/or the second earpiece is a hearing device as disclosed herein. The antenna arrangement disclosed herein is particularly advantageous when provided in a hearing device configured for placement in the user's ear canal or concha, e.g., ITC—or CIC-hearing aids or ear buds, as these are surrounded by more tissue during operation, and thus gain a greater improvement by being provided with the option of selecting alternative wireless signal paths.

The hearing device is configured for wireless communication with one or more devices, such as with another hearing device, e.g., as part of a binaural hearing system, and/or with one or more accessory devices, such as a smartphone and/or a smart watch. The wireless input signal(s) may origin from external source(s), such as spouse microphone device(s), wireless TV audio transmitter, and/or a distributed microphone array associated with a wireless transmitter. The wireless input signal(s) may origin from another hearing device, e.g., as part of a binaural hearing system, and/or from one or more accessory devices.

The hearing device comprises a wireless communication unit, such as a radio transceiver, coupled to the first antenna and the second antenna. The wireless communication unit may be configured to convert an antenna output signal to a transceiver input signal. Wireless signals from different external sources may be multiplexed in the wireless communication unit to a transceiver input signal or provided as separate transceiver input signals on separate wireless communication unit output terminals of the wireless communication unit.

The hearing device comprises at least one input transducer. The at least one input transducer may be one or more microphones and/or one or more bone vibration sensors. The at least one input transducer is/are configured for the provision of a transducer input signal. In one or more exemplary hearing devices, the at least one input transducer is provided by two, three, or four microphones.

The hearing device may comprise a processor for processing input signals, such as transceiver input signal(s) and/or transducer input signal(s). The processor is optionally configured to compensate for hearing loss of a user of the hearing device, The hearing device may comprise a processor, wherein the processor may be configured to compensate for a hearing loss of a user, i.e., apply frequency dependent gain to input signals, such as transducer input signals, in accordance with the user's frequency dependent hearing impairment and forward the compensated audio signal to the output transducer to output an audible signal to the user. The processor may be connected to the wireless communication unit for processing the transceiver input signal. The processor may be connected the at least one input transducer for processing the transducer input signal. The processor may comprise one or more A/D-converters for converting analog transducer/transceiver input signal(s) to digital pre-processed input signal(s).

The processor may provide an electrical output signal based on the input signal(s) to the output transducer, e.g., a receiver or cochlear implant. It is noted that in the field of hearing devices, the term receiver is used for the miniature loudspeaker providing the acoustic output. Input terminal(s) of the processor are optionally connected to respective output terminals of a pre-processing unit, the wireless communication unit, and/or the input transducer(s). For example, a wireless communication unit input terminal of the processor may be connected to a wireless communication unit output terminal of the wireless communication unit. One or more input transducer input terminals of the processor may be connected to respective one or more input transducer output terminals of the one or more input transducers.

Both the first antenna and the second antenna are configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHZ. The first frequency may be 5.725 GHz to 5.875 GHz.

The hearing device comprises a housing. The housing may be adapted to be arranged at least partly in the ear canal of a user. The housing may be adapted to be arranged at least partly in the concha of a user. A first part of the housing may be adapted to be arranged in the concha of the user and a second part of the housing may be adapted to be arranged in the ear canal of the user.

The hearing device comprises a battery. The battery may be a rechargeable battery. The hearing device may comprise a printed circuit board (PCB). The PCB may comprise one or more of the processor, the wireless communication unit, the first segment, the second segment, and a power management unit. The PCB may be a flexible PCB, flex-PCB provided with bending zones. The PCB may be folded around the battery. The PCB may be folded around the output transducer.

The hearing device may comprise a coil antenna. The coil antenna may comprise a magnetic core. The coil antenna comprises a coil. The coil may be coiled around the magnetic core. The coil antenna extends in a third direction. The third direction may be substantially parallel with the reference axis. The third direction may be substantially perpendicular to the first and/or second directions. The coil antenna comprises a third feed coupling the coil antenna to the wireless communication unit. The coil antenna is configured for establishing a second wireless link. The coil antenna is configured for communication at a frequency different from the first and second antennas. When operating the coil antenna, the wireless communication unit may be configured for communication at a second frequency, the second frequency being different from the first frequency. The second frequency may be below 100 MHZ. The second frequency may be between 9 MHZ and 15 MHZ.

The wireless communication unit may be operable in switching mode, in which the wireless communication unit is configured for switching between transmitting and/or receiving via the first antenna and transmitting and/or receiving via the second antenna, and/or in a combining mode, in which the wireless communication unit is configured for transmitting and/or receiving via both the first antenna and the second antenna.

The switching mode provides the hearing device with two options when transmitting and receiving, which are using either the first antenna or the second antenna. As the two antennas extend in different directions, this enables a binary directionality of the antenna arrangement. While switching mode only enables two different directions for beam-steering, this is in many cases enough to achieve sufficient quality of the wireless link as the antenna arrangement can be directed in two different directions, e.g., towards the front or back pocket of the user, depending on the first and second directions. At the same time, switching mode can be implemented without the need for an advanced wireless communication unit to control transmission and reception and can thus be made more cost-effective as it only requires a switch to select between the channels, i.e., the first antenna and the second antenna.

The combining mode provides the hearing device with further options. In the combining mode, both channels, i.e., both of the first antenna and the second antenna, are fed when transmitting and both channels are used when receiving. The diversity of the directionality depends on how advanced the wireless unit is, i.e., what degree of control it is configured for.

The wireless communication unit may be configured for, when transmitting in the combining mode, feeding the first and second antennas with a signal, wherein the signal fed to the first antenna and to the second antenna is either substantially in phase or substantially 180 degrees out of phase. Similarly, the wireless communication unit may be configured for, when receiving in the combining mode, adding signals received by the first and second antennas either substantially in phase or substantially 180 degrees out of phase.

Like switching mode, this binary control of the phase, i.e., in/out of phase, allows for the antenna arrangement to be beam-steered in two different directions. In some cases, it is sufficient to only have two different directions to steer the antenna arrangement in, and in such cases a less advanced wireless communication unit can be provided. In a particularly advantageous embodiment, the wireless communication unit is configured for selectively operating in the switching mode and the combining mode, wherein the channels are selectively used substantially in phase or substantially 180 degrees out of phase. This enables the antenna arrangement to be beam-steered in four different directions, which provides an excellent compromise between how many directions the antenna arrangement can be steered in and how advanced, and thus costly, the wireless communication unit has to be.

The wireless communication unit may be adapted for, when transmitting in the combining mode, feeding the first and second antennas with a signal, wherein the signal fed to the first antenna and second antenna with a different phase, i.e., a phase shift from 0-180 degrees, and/or a different gain. By controlling the phase and/or gain of the signal fed to the first antenna relative to the signal fed to the second antenna, a more versatile beam-steering can be achieved, and thus a more stable wireless link can be achieved regardless of the user's body shape and position of the external device, which the hearing device is communicating wirelessly with.

Alternatively, or additionally, the antenna arrangement can also be steered by controlling the gain added when feeding the first and second antenna when transmitting, or the gain added to the channels when receiving. The wireless communication unit may be configured for, when receiving in the combining mode, coherently adding signals received via the first antenna and the second antenna by using equal gain combining and/or maximal-ratio combining. When using maximal-ratio combining, the signals from each channel are added together, the gain of each channel is made proportional to the rms (root-mean square) signal level and inversely proportional to the mean square noise level in that channel. Different proportionality constants may be used for each channel.

Similarly, the wireless communication unit may be configured for, when transmitting in the combining mode, feeding signals to the first antenna and second antenna, respectively, using equal gain combining and/or maximal-ratio combining.

The wireless communication unit may be configured for obtaining a wireless link characteristic by measuring a quality of the wireless link in a setting, e.g., switching mode using the first antenna, combining mode using both the first and second antennas in phase with equal gain, etc. The measuring may comprise comparing a strength and/or phase of a signal received by the first antenna and a strength of a signal received by the second. The measuring may comprise comparing a parity check of a signal received by the first antenna to a parity check of a signal received by the second antenna. The measuring may comprise comparing a cyclic redundancy check of a signal received by the first antenna to a cyclic redundancy check of a signal received by the second antenna.

The wireless communication unit may be configured for, based on the measuring, approximate a direction in which the origin of a received signal is located. The measuring may comprise comparing a packet loss of a signal received by the first antenna to a packet loss of a signal received by the second antenna.

The wireless communication unit may be configured for, when transmitting and/or receiving in the switching mode, selecting to transmit/receive via the first antenna or the second antenna based on the wireless link characteristic. The wireless communication unit may be configured for, when transmitting in the combining mode, applying the phase difference and/or gain difference to the signal fed to the first antenna and second antenna based on the wireless link characteristic. The wireless communication unit may be configured for, when receiving in the combining mode, adding signals received by the first antenna and the second antenna using a phase difference and/or gain difference selected based on the wireless link characteristic. It is advantageous to provide a wireless communication unit configured for measuring the wireless link quality in different settings as it allows the wireless communication unit to determine which setting may provide the better wireless link quality and select that setting.

The first direction may be perpendicular +/−20°, preferably +/−10°, more preferably +/−5°, to the reference axis. The second direction may be perpendicular +/−20°, preferably +/−10°, more preferably +/−5°, to the reference axis. The second direction may be perpendicular +/−30°, preferably +/−20°, more preferably +/−10°, more preferably +/−5°, to the first direction.

It is advantageous that the first and/or the second directions are substantially perpendicular to the reference axis, i.e., substantially parallel with the user's head when the hearing device is placed in its operable position in the user's ear, as this provides the first and/or the second antennas with a directionality along the body of the user and not directed inwards towards the user's head. Furthermore, it is particularly advantageous the second direction is substantially perpendicular to the first direction as this provides the first antenna and the second antenna with maximum directionality difference and thus the antenna arrangement with an optimized directionality diversity.

The first direction may have an of angle of 45° +/−20°, preferably 45° +/−10°, more preferably 45° +/−5°, with the vertical direction when the hearing device is placed in an operable position. The second direction may have an of angle of 45° +/−20°, preferably 45° +/−10°, more preferably 45° +/−5°, with the vertical direction when the hearing device is placed in an operable position.

It is advantageous that the first and/or the second directions has an angle of substantially 45° with the vertical axis as this provides the first and/or second antenna with a direction pointed forwards or backwards relative to the user. It is particularly advantageous when the first and second directions are both substantially perpendicular to the reference axis, substantially perpendicular to each other, and the first direction has an of angle of substantially 45° with the vertical axis, whereby the second direction also has an of angle of substantially 45° with the vertical axis as it is perpendicular to the first direction, as this configuration provides the antenna arrangement with optimized directionality diversity directed along the user's body and towards their front and back. This can alternatively also be achieved when the first and second directions are both substantially perpendicular to the reference axis, and preferably substantially perpendicular to each other, by using the combining mode to shape the directionality of the antenna arrangement by controlling the phase and/or gain when transmitting or when adding signals from the first and second antennas when receiving.

The first and second segments may be displaced with respect to each other along the reference axis. The first and second antennas are galvanically isolated from each other. It is advantageous the first and second antennas are displaced from each other as it reduces a capacitive coupling between the first antenna and the second antenna. Preferably, the first and second segments may be displaced a distance of 15 μm to 2 mm along the reference axis from each other. This provides an advantageous compromise between reducing the capacitive coupling between the first and second antennas and avoiding excessive volume uptake by the antenna arrangement as it has to fit inside a miniaturized device.

The first and second segments may overlap when seen along the reference axis. The first segment has a first length, $L_1$. The second segment has a second length, $L_2$. The first length may be the same as the second length. The first length may be different from the second length. $L_1$ may be equal to $L_2$ +/−20% of $L_2$, preferably +/−10% of $L_2$, more preferably +/−5% of $L_2$. The first and second segments may overlap at a midpoint of the first segment and at a midpoint of the second segment when seen along the reference axis. The midpoint of the of the first segment may be located at $L_1$ divided by 2+/−10% of $L_1$, preferably +/−5% of $L_1$. The midpoint of the of the second segment may be located at $L_2$ divided by 2+/−10% of $L_2$, preferably +/−5% of $L_2$. It is advantageous the first and second segments overlaps as this optimizes the combined radiation pattern, and thus directionality, of the antenna arrangement when operating in the combining mode.

The first segment may form part of a first loop. The second segment may form part of a second loop. The first loop may be a square loop. The second loop may be a square loop. The first loop may have four sides of substantially equal length. The second loop may have four sides of substantially equal length. The sides of the first loop may be of substantially equal length. The sides of the second loop may be of substantially equal length. The first loop may be a small loop, i.e., a loop where the combined length is small relative to the wavelength at the first frequency. The second loop may be a small loop.

It is advantageous that the current would be high and the voltage low everywhere on the first antenna and the second antenna. This means that the antennas primarily store energy in the magnetic near-field, and less in the electric near-field. This in turn means less losses due to the human tissue nearby which is non-magnetic. The small loop-antenna characteristics with a high current density everywhere may be emulated with tuning caps, i.e., the first and/or second antennas may be provided with one or more multiple tuning caps to provide them with the characteristics of a small loop antenna.

The first antenna may comprise at least one tuning cap. The second antenna may comprise at least one tuning cap. The first antenna may comprise multiple tuning caps. The multiple tuning caps of the first antenna may be substantially equally distributed along the combined length of the first loop. The second antenna may comprise multiple tuning caps. The multiple tuning caps of the second antenna may be substantially equally distributed along the combined length of the second loop. The term tuning cap is used for a tuning-component, including both capacitors and inductors. In practice, the series tuning capacitors would be used as described above, since they effectively "contain" the necessary e-field from the antenna and "hide" it from the nearby tissue by ensuring a high current on the respective antenna itself.

It is advantageous to provide the first antenna and/or the second antenna with tuning caps as this allows the first and/or second antenna to be spatially long, while retaining the current distribution of an electrically short antenna, leading to less tissue losses as described above. This is highly advantageous for fitting the antenna arrangement in a hearing device where the internal volume is very limited, e.g., an ear bud or an ITC or CIC hearing aid. It is advantageous to provide the first and/or second antenna with multiple tuning caps equally distributed along the combined length of the first and/or second antenna, respectively, as this allows the current distribution to be substantially equal along the combined length of the first and/or second antenna. The term combined length is used for the total spatial length of the first antenna and second antenna.

The first loops may have a substantially equal current distribution along the four sides when transmitting. The second loops may have a substantially equal current distribution along the four sides when transmitting. This provides a radiation pattern that is shaped by the current on the loop on the "outside/top-side" face of the device, i.e., on the side of the loop proximate the faceplate and the side furthest away from the user's head during operation. On this side of the loop, a high current is desired. A way to achieve that is to have a high current density everywhere, which also leads to more magnetic near-field energy and less tissue losses.

FIG. 1 schematically illustrates a phantom head model of a user, and a three-dimensional coordinate system with an x, y, and z axis. When designing antennas for wireless communication proximate the human body, the human head can be approximated by a rounded enclosure, such as enclosure 3. FIG. 1 shows a rounded enclosure 3 including sensory organs, such as the nose, ears, mouth, and eyes attached thereto. The rounded enclosure 3 may be seen as illustrating the phantom head model from the front together with a three-dimensional coordinate system with an x, y and z axis for defining orientations with relation to the head.

The phantom head may model a user that is standing erect on the ground where the ground plane, in this context the horizontal pane, not an electrical ground plane, is parallel to yz-plane, the vertical direction is parallel to the x-axis, and the ear-to-ear axis is parallel to the z-axis. Throughout this document, reference is made to the reference axis. The reference axis follows the hearing device and when the hearing device is arranged in its operational position, the reference axis is parallel to the user's ear-to-ear axis/the z-axis.

A point of the surface of the phantom head model (such as a point of the surface of the head of a user 2) has a normal vector and a tangential vector. The normal vector is orthogonal to the surface of the head. The tangential vector is parallel to the surface of the head. An element and/or a plane extending along the surface of the head is said to be parallel to the surface of the head. An element and/or a plane extending from a point on the surface of the head and radially outward from the head into the surrounding space is said to be orthogonal to the surface of head.

The in the ear canal type of hearing aid has an elongated housing shaped to fit in the ear canal. The longitudinal axis of in the ear canal type of hearing aid is then parallel to the ear-to-ear axis, whereas the face plate of in the ear canal type of hearing aid is in a plane orthogonal to the z axis, i.e., parallel with the xy-plane. The behind the ear type of hearing aid has an elongated housing most often shaped as a banana to rest on top of the auricle of the ear. The housing of behind the ear type of hearing aid has a longitudinal axis parallel to the surface of the head of the user.

Figure 2:
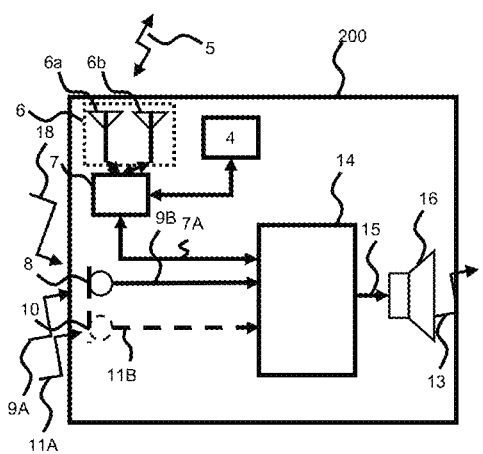
FIG. 2 is a block diagram of an exemplary hearing device according to the disclosure.

FIG. 2 is a block diagram of an exemplary hearing device according to the disclosure. The hearing device 200 comprises an output transducer, such as a receiver, 16 for transmission of an output signal 15. The output transducer 16 is configured to convert the output signal 15 into an audio—or electronic stimuli-output signal 11. The hearing device 200 comprises a set of input transducers 8, 10. The set of input transducers 8, 10 comprises a first microphone 8, such as a microphone configured to receive sounds from the environment outside the hearing device 200, such as facing the surroundings of the user. For example, the first microphone 8 may obtain an input signal 9B based a received audio signal 18 and may provide the input signal 9B to other modules of the hearing device 200.

The set of input transducers 8, 10 optionally comprises a second microphone 10 for obtaining a second input signal 11B, which is based on the audio signal 11A. The hearing device 200 comprises a processor 14 for processing input signals 7A, 9B, 11B and providing an output signal 15. The processor 14 may be connected to a wireless communication unit 7 and/or the microphone(s) 8, 10 for receiving and processing signals. The processor 14 may be configured for applying frequency dependent gain according to a user's hearing impairment.

The hearing device 200 optionally comprises a coil antenna 4 configured for bi-directional magnetic induction communication. The coil antenna 4 may comprise a coil part, e.g., coiled along a coil antenna axis, the coil antenna axis preferably being substantially parallel with the reference axis. The hearing device 200 comprises an antenna arrangement 6 for bi-directional wireless communication at a first frequency, the antenna arrangement comprising a first antenna 6a and a second antenna 6b each antenna 6a, 6b being configured for communication at the first frequency.

The hearing device 200 may comprises a wireless communication unit, such as a transceiver, 7 for provision of a transceiver input signal 7A. the wireless communication unit 7 is coupled to the optional coil antenna 4 and the antenna arrangement 6 for converting the antenna output signal(s) to one or more transceiver input signals 7A. The antenna arrangement 6 comprises a first antenna 6a and a second antenna 6b, each being coupled individually to the wireless communication unit 7 through a first feed and a second feed, respectively, so that the wireless communication unit 7 can feed/receive signals to/from the first antenna 6a independently of the second antenna 6b and feed/receive signals to/from the second antenna 6b independently of the first antenna 6a.

The output transducer 16 is configured to transmit an output signal 15. The output transducer 15 may be a receiver, i.e., a loudspeaker, or a cochlear implant. If the output transducer 16 is a receiver, the output is in the form of an audio output signal 11 to be directed towards an eardrum 42 of the hearing device user. If the output transducer 16 is a cochlear implant, the output is in the form of an electronic stimuli output signal 11 for electronic stimulation of the cochlear nerve of the hearing device user.

Figure 3:
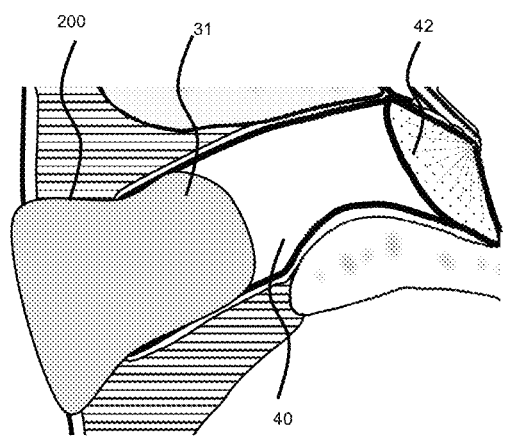
FIG. 3 is a schematic diagram illustrating an exemplary hearing device in the ear canal of a user, according to this disclosure.

FIG. 3 is a cross-section of a user's ear having an exemplary hearing device 200 partly inserted in the ear canal 40 of the ear according to the disclosure. The ear canal 40 leads to the ear drum, also called the tympanic membrane, 42. The hearing device 200 is an in-the-canal (ITC) hearing device. The hearing device 200 comprises a housing 31.

Figure 4A:
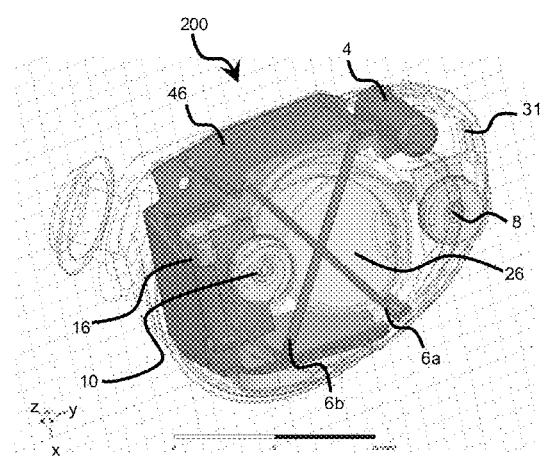
FIG. 4*a* is a schematical illustration of a hearing device according to this disclosure.
Figure 4B:
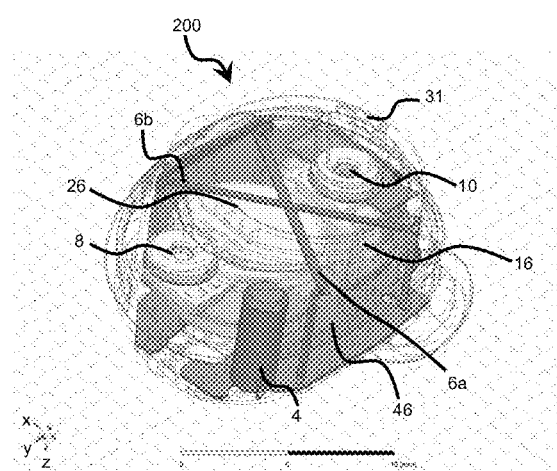
FIG. 4*b* is a schematical illustration of a hearing device according to this disclosure.

FIGS. 4a and 4b schematically illustrate a hearing device 200 in accordance with some embodiments. The shown hearing device 200 is an ear bud and thus comprise a housing 31 shaped to be arranged in the concha of the user. The hearing device 200 comprises an antenna arrangement 6 comprising a first antenna 6a and a second antenna 6b. The first antenna 6a is coupled to the wireless communication unit 7 via a first feed 63. The second antenna 6b is coupled to the wireless communication unit 7 via a second feed 64. The wireless communication unit 7 is configured for operating in a switching mode, in which the wireless communication unit 7 selects whether to feed and receive from the first antenna 6a via the first feed 63 or to feed and receive from the second antenna 6b via the second feed 64.

The wireless communication unit 7 is further configured for operating in a combining mode, in which the wireless communication unit 7 feeds and receives from both the first antenna 6a and the second antenna 6b. In the combining mode, the wireless communication unit 7 feeds a signal to first antenna 6a and to the second antenna 6b when transmitting. The signal fed to the second feed 64 may be applied a different phase and/or gain than the signal fed to the first feed 63 so as to steer the radiation pattern and/or polarization of the antenna arrangement 6. Similarly, the wireless communication unit 7 is configured for adding signals received by the first antenna 6a and the second antenna 6b when receiving. When receiving, the wireless communication unit 7 is configured for adding a signal received by the first antenna 6a with a signal received by the second antenna 6b using either equal gain combining or maximal-ratio combining. Optimally, the two signals are added coherently but the phase shift applied to one channel relative to the other may depend how advanced the wireless communication unit 7 is, i.e., with what resolution it can apply a phase shift from 0 to 180 degrees. Thus, when receiving, the wireless communication unit 7 is configured for adding a signal received by the first antenna 6a with a signal received by the second antenna 6b by minimizing the phase difference between the two signals. If provided with a more advanced wireless communication unit 7, the phase shift may be controlled more continuously or in smaller steps, e.g., four bit resolution where the phase shift could be 0, 60, 120, and 180 degrees.

The hearing device 200 also comprises two input transducers 8, 10, provided by a first microphone 8 and a second microphone 10. The two input transducers 8, 10 are arranged along the y-axis, i.e., along the front-to-back axis of the user when the hearing device 200 is arranged in the operational position and displaced from each other along the y-axis so that the two input transducers 8, 10, may perform beam-forming in the horizontal plane, i.e., the yz-plane.

The hearing device 200 also comprises an output transducer 16 provided by a receiver 16. The receiver 16 is configured for converting the output signal 15 from the processor 7 into an audio output signal 13. The hearing device 200 comprises a rechargeable battery 26 configured for providing the hearing device 200 with energy. The hearing device 100 comprises a printed circuit board, PCB, 46, which is folded about the battery 26 and the output transducer 16 to minimize space consumption. The PCB 46 comprises multiple electrical components including the processor 14 and the wireless communication unit 7.

Figure 5:
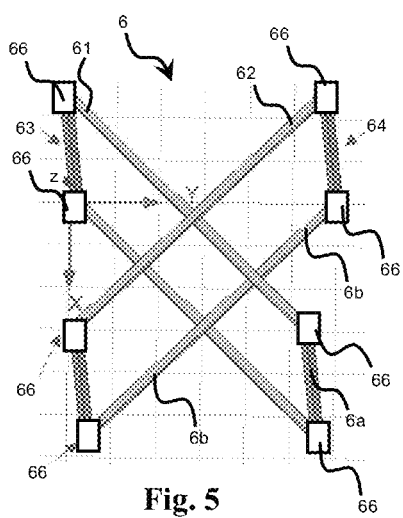
FIG. 5 is a schematical illustration of an antenna arrangement according to this disclosure.

FIG. 5 schematically illustrates an antenna arrangement 6 similar to the one shown in FIGS. 4a and 4b. The first antenna 6a comprises a first electrically conducting segment 61, which extends in a first direction in the xy-plane. The second antenna 6b comprises a second electrically conducting segment 62, which extends in a second direction in the xy-plane, the second direction being perpendicular to the first direction. When the hearing device 200 is placed in the operational position in the ear of the user, the first and second directions will each be substantially perpendicular to the ear-to-ear axis of the user, i.e., perpendicular to the z-axis, be at an angle of substantially 45° with the vertical axis, i.e., the x-axis, and be perpendicular to each other.

The first antenna 6a comprises a first feed 63 and the second antenna 6b comprises a second feed 64. The first feed 63 couples the first antenna 6a to the wireless communication unit 7 and the second feed 64 coupled the second antenna 6b to the wireless unit 7. By providing each of the first and second antennas 6a, 6b with their own feed 63, 64 the wireless communication unit 7 becomes capable of controlling the first and second antennas 6a, 6b independently of each other.

In the shown embodiment, the first antenna 6a and the second antenna 6b are both square loop antennas, where the first segment 61 forms a side of the first loop and the second segment 62 forms a side of the second loop. Each loop may have four sides of substantially the same length. The first antenna 6a comprises multiple tuning caps 66, which in the shown embodiment is provided by four tuning caps 66 equally distributed along the total length of the first antenna 6a, e.g., in each corner of the first loop as shown. Similarly, the second antenna 6b comprises multiple tuning caps 66, which in the shown embodiment is provided by four tuning caps 66 equally distributed along the total length of the second antenna 6b, e.g., in each corner of the second loop as shown.

As mentioned above, it is advantageous to have a high current in the first segment 61 and the second segment 62 as these segments 61, 62 form the sides of the first loop and the second loop, respectively, that are proximate to the faceplate and thus provide the side of each loop which is furthest from the head of the user, when the hearing device 200 is placed in the ear of the user. This is achieved by the tuning caps 66 which provides the first and second loops with the characteristics of electrically small loop antennas.

When seen along the z-axis, the first and second segments 61, 62 overlaps at a midpoint of the first segment 61 and at a midpoint of the second segment 62. Thus, when seen along the z-axis the first segment 61 and the second segment 62 form an X. The first segment 61 and the second segment 62 are displaced from each other along the z-axis so as to galvanically isolate the first and second segments 61, 62 from each other and to reduce a capacitive coupling between the first and second segments 61, 62.

Figure 6:
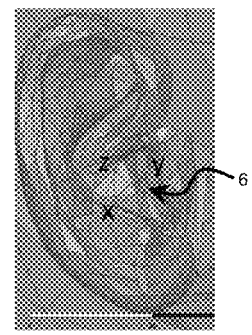
FIG. 6 shows a simulation of an antenna arrangement according to this disclosure in the human ear.

FIG. 6 shows a simulation of the antenna arrangement 6 of FIG. 5 when placed in a human ear. In FIG. 6, the z-axis goes into the ear, i.e., parallel to the ear-to-ear axis, the y-axis is parallel with the user's back-to-front axis, and the x-axis is parallel with the vertical axis.

Figures 7A, 7B, 7C, 7D:
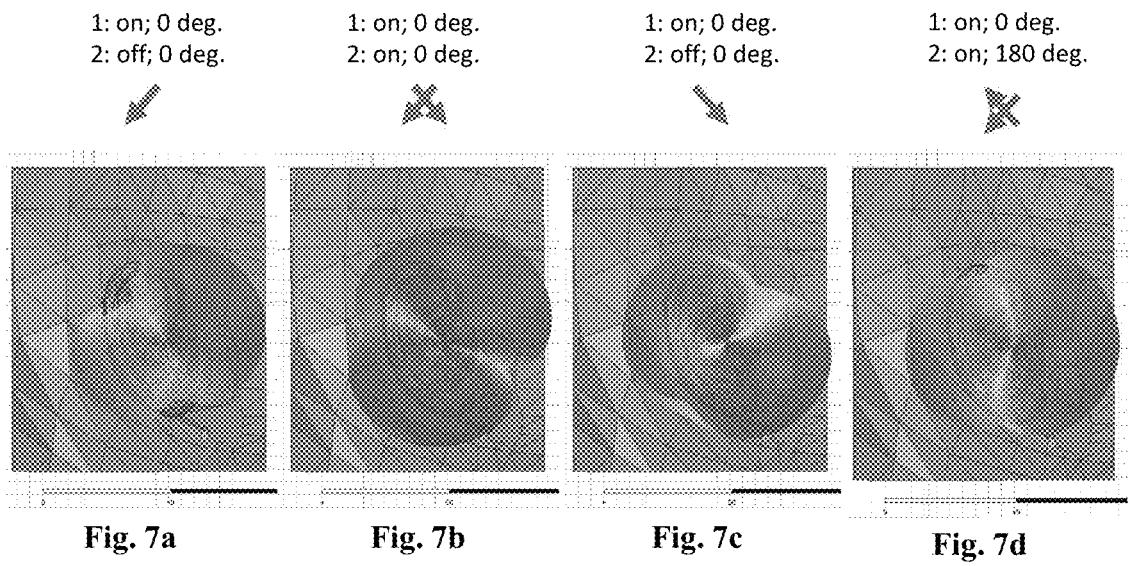
FIG. 7*a-d* show the results of simulations of an antenna arrangement according to this disclosure in the human ear.

The resulting radiation pattern can be seen in FIGS. 7a-d. In FIG. 7a, the wireless communication unit 7 is operated in the switching mode and is only feeding the first antenna 6a when transmitting, and only receiving from the first antenna 6a. The resulting directionality of the antenna arrangement 6 is in a direction parallel to the first direction. This will increase the antenna arrangement's 6 signal quality when communicating with an external device arranged in the user's back pocket. Similarly, in FIG. 7c the wireless communication unit 7 is operated in the switching mode and is only feeding the second antenna 6b when transmitting, and only receiving from the first antenna 6b. The resulting directionality of the antenna arrangement 6 is in a direction parallel to the second direction. This will increase the antenna arrangement's 6 signal quality when communicating with an external device arranged in the user's front pocket.

In FIG. 7a, the wireless communication unit 7 is operated in the combining mode and is feeding both of the first antenna 6a and the second antenna 6b when transmitting and receiving from both of the first antenna 6a and the second antenna 6b. In FIG. 7b the first and second antennas 6a, 6b are fed in phase with substantially equal gain. The resulting radiation pattern is a superposition of the radiation of the first antenna 6a and the radiation pattern of the second antenna 6b, meaning that the directionality of the antenna arrangement 6 is parallel to the vertical direction, i.e., the x-axis. Similarly, in FIG. 7d, the wireless communication unit 7 is operated in the combining mode and is feeding both of the first antenna 6a and the second antenna 6b when transmitting and receiving from both of the first antenna 6a and the second antenna 6b. In FIG. 7d the first and second antennas 6a, 6b are fed 180 degrees out of phase with substantially equal gain. The resulting radiation pattern is in the horizontal plane directed forward, i.e., the y-axis.

In order to determine which mode of operation and/or which phase and/or gain to apply, the wireless communication unit 7 may be configured to measure the wireless link quality 5 provided by different settings. In this context, setting is used for the different modes, e.g., switching mode and combining mode, in combination with the different variables used in the modes, e.g., using the first antenna or the second antenna, applying a phase shift, and/or applying different gains. The measurement of each setting results in a wireless link characteristic. The wireless communication unit 7 may be configured for comparing the wireless link characteristics to determine a better performing setting. The wireless communication unit 7 may be configured for selecting the better performing setting and utilizing in for subsequent transmission and reception time slots.

As situations are dynamic and circumstances may change during operation, the wireless communication unit 7 may be configured for periodically measuring the wireless link characteristics again to provide an updated basis for selecting an updated better performing setting to operate in so that the wireless link 5 remains optimized.

Figure 8:
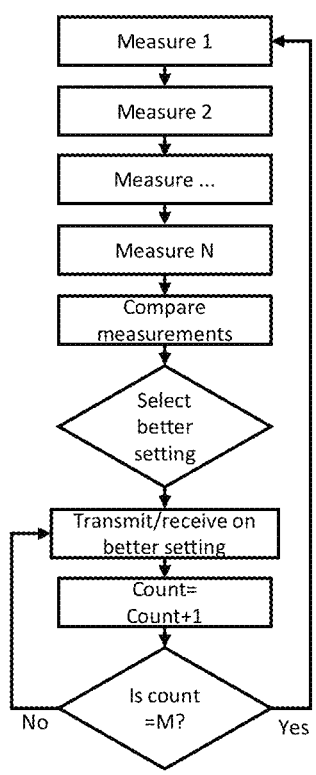
FIG. 8 shows a flow chart for a method of operating the hearing device according to this disclosure.

FIG. 8 shows a flow chart for a method of operating the hearing device 200 of the disclosure. Subsequent to establishing a wireless link 5 the wireless communication unit 7 selects to receive in a first setting, e.g., combining mode with the first and second antenna 6a, 6b in phase, as shown in FIG. 7b, and measures a quality of the wireless link 5 to obtain a first wireless link characteristic. Then, the wireless communication unit 7 selects to receive in a second setting, e.g., switching mode with the first antenna 6a, as shown in FIG. 7a, and measures a quality of the wireless link 5 to obtain a second wireless link characteristic. If the hearing device is configured for operating at more than two different settings, i.e., various combinations of switching/combining mode, first antenna 6a/second antenna 6b, phase difference, and/or gain difference, this process may be repeated for N different settings, including the first two measurements, where N is an integer greater than two.

Upon having measured the different settings, the wireless communication unit 7 is configured for comparing the settings to determine the better performing of the settings. The wireless communication unit 7 is configured for using the comparison to select the better performing setting for the subsequent M time slots, where M is a positive integer. After having used the better performing setting for M time slots, the wireless communication unit 7 is configured for repeating the measurements to update the better performing setting.

In an example where the hearing device 200 has established a wireless link with an external device, e.g., a smart phone, the wireless communication unit 7 selects to receive a first data packet via the first channel in the switching mode, i.e., using only the first antenna 6a, and subsequently selects to receive a second data packet via the second channel in the switching mode, i.e., using only the second antenna 6b. The wireless communication unit 7 then compares one or more of the received signal strength, packet loss, cyclic redundancy check, etc., and determines a link quality of each channel. Having determined a better channel, the wireless communication unit 7 proceeds by using the better channel, while periodically, e.g., every third time slot, selecting to use the worse channel so that an updated comparison may be performed. Should the circumstances change so that the quality of previously better channel falls below that of the previous worse channel, the wireless communication unit 7 may select to proceed using the currently better channel.

In another example where the hearing device 200 has established a wireless link with an external device, the wireless communication unit 7 selects to receive in the combining mode. The wireless communication unit 7 then determines the phase difference between the signal from the first channel and the signal from the second channel to estimate the direction from which the received signal originates. Based on this estimate, the wireless communication unit 7 determines which phase—and/or gain difference, if any, to apply when feeding the first and second antennas 6a, 6b in subsequent transmission time slots and which phase— and/or gain difference, if any, to apply when adding signals received by the first and second antennas 6a, 6b in subsequent reception time slots.

In a third example, the two previous examples are combined, such that the wireless communication unit 7 measures and obtains a wireless link characteristic for both the channels in switching mode and for multiple settings in the combining mode, compares the measurements, selects the better performing setting, transmit and receives using the better performing setting for M time slots, and then proceeds to update the better performing setting by repeating the measurement process.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed. It is to be noted that the words "a" or "an" preceding an element do not exclude the presence of a plurality of such elements. It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are accordingly to be regarded in an illustrative rather than restrictive sense. The claimed invention is intended to cover all alternatives, modifications, and equivalents.

LIST OF REFERENCES 2 point
3 rounded enclosure
200 hearing device
4 coil antenna
5 wireless link
6 antenna arrangement
6a first antenna
6b second antenna
61 first segment
62 second segment
64 first feed
65 second feed
66 tuning cap
7 wireless communication unit
7A transceiver input signal
8 first input transducer
9A audio or bone vibration signal received as input at the first input transducer
9B input signal from first input transducer
10 second input transducer
11A audio or bone vibration signal received as input at the second input transducer
11B second input signal from second input transducer
13 audio or electronic stimuli output signal emitted by the output transducer 14 processor
15 output signal
16 output transducer
26 battery
31 housing
40 ear canal
42 ear drum/tympanic membrane
46 PCB

The invention claimed is:

1. A hearing device for placement in an ear of a user, the hearing device comprising:
   at least one input transducer;
   an output transducer;
   a wireless communication unit and an antenna arrangement configured to provide a wireless link; and
   a reference axis, the reference axis being parallel to an ear-to-ear axis of the user when the hearing device is placed in an operable position;
   wherein the antenna arrangement comprises:
      a first antenna configured for EM-radiation transmission and EM-radiation reception at a first frequency, the first antenna comprising a first electrically conducting segment extending in a first direction;
      a second antenna configured for EM-radiation transmission and EM-radiation reception at the first frequency, the second antenna comprising a second electrically conducting segment extending in a second direction, the second direction being different from the first direction;
      a first feed coupling the first antenna to the wireless communication unit, and
      a second feed coupling the second antenna to the wireless communication unit;
   wherein the first direction is at an angle relative to a vertical axis when the hearing device is placed in the operable position, the angle being 45° +/−20°.

2. The hearing device of claim 1, wherein the wireless communication unit is operable in a switching mode, in which the wireless communication unit is configured to switch between (1) transmitting and receiving via the first antenna or (2) transmitting and receiving via the second antenna; and/or
   wherein the wireless communication unit is operable in a combining mode, in which the wireless communication unit is configured to transmit and receive via both the first antenna and the second antenna.

3. The hearing device of claim 2, wherein the wireless communication unit is configured to, when transmitting in the combining mode, feed the first antenna and the second antenna with respective signals having different respective phases and/or different respective gains, and/or
   wherein the wireless communication unit is configured to, when receiving in the combining mode, add a signal received by the first antenna and a signal received by the second antenna by applying a phase shift and/or a gain difference for one of the signals.

4. The hearing device of claim 2, wherein the wireless communication unit is configured to, when receiving in the combining mode, coherently add a signal received via the first antenna and a signal received via the second antenna by using equal gain combining and/or maximal-ratio gain combining.

5. The hearing device of claim 2, wherein the wireless transmission unit is configured to, when transmitting or receiving in the switching mode, select the first antenna or the second antenna based on a wireless link characteristic; and/or
   wherein the wireless transmission unit is configured to, when transmitting in the combining mode, apply a phase difference and/or a gain difference for signals fed to the first antenna and second antenna based on the wireless link characteristic.

6. The hearing device of claim 2, wherein the wireless communication unit is configured to:
   when transmitting in the combining mode, feed the first and second antennas with respective signals, wherein the signals fed respectively to the first antenna and to the second antenna are substantially in phase or substantially 180 degrees out of phase; and/or
   when receiving in the combining mode, add signals received by the first antenna to signals received by the second antennas, wherein the signals are added either substantially in phase or substantially 180 degrees out of phase.

7. The hearing device of claim 1, wherein the wireless communication unit is configured to compare a strength and/or a phase of a signal received by the first antenna, and a strength of a signal received by the second antenna, to obtain a wireless link characteristic.

8. The hearing device of claim 1, wherein the first direction is at an angle relative to the reference axis, the angle being 90° +/−20°.

9. The hearing device of claim 1, wherein the second direction is at an angle relative to the reference axis, the angle being 90° +/−20°.

10. The hearing device of claim 1, wherein the second direction is at an angle relative to the first direction, the angle being 90° +/−30°.

11. The hearing device of claim 1, wherein the first and second segments are displaced with respect to each other along the reference axis.

12. The hearing device of claim 1, wherein one or each of the first antenna and the second antenna comprises at least one tuning cap.

13. The hearing device of claim 1, wherein one or each of the first antenna and the second antenna comprises multiple tuning caps.

14. A hearing device for placement in an ear of a user, the hearing device comprising:
   at least one input transducer;
   an output transducer:
   a wireless communication unit and an antenna arrangement configured to provide a wireless link; and
   a reference axis, the reference axis being parallel to an ear-to-ear axis of the user when the hearing device is placed in an operable position;
   wherein the antenna arrangement comprises:
      a first antenna configured for EM-radiation transmission and EM-radiation reception at a first frequency, the first antenna comprising a first electrically conducting segment extending in a first direction;
      a second antenna configured for EM-radiation transmission and EM-radiation reception at the first frequency, the second antenna comprising a second electrically conducting segment extending in a second direction, the second direction being different from the first direction;
      a first feed coupling the first antenna to the wireless communication unit, and
      a second feed coupling the second antenna to the wireless communication unit;
   wherein the first and second segments overlap when viewed along the reference axis.

15. The hearing device of claim 14, wherein the first and second segments overlap at a midpoint of the first segment and at a midpoint of the second segment.

16. The hearing device of claim 14, wherein the first direction is at an angle relative to a vertical axis when the hearing device is placed in the operable position, the angle being 45° +/−20°.

17. The hearing device of claim 14, wherein the wireless communication unit is operable in a switching mode, in which the wireless communication unit is configured to switch between (1) transmitting and receiving via the first antenna or (2) transmitting and receiving via the second antenna; and/or
wherein the wireless communication unit is operable in a combining mode, in which the wireless communication unit is configured to transmit and receive via both the first antenna and the second antenna.

18. The hearing device of claim 14, wherein the wireless communication unit is configured to compare a strength and/or a phase of a signal received by the first antenna, and a strength of a signal received by the second antenna, to obtain a wireless link characteristic.

19. The hearing device of claim 14, wherein the first direction is at an angle relative to the reference axis, the angle being 90° +/−20°.

20. The hearing device of claim 14, wherein the second direction is at an angle relative to the reference axis, the angle being 90° +/−20°.

21. The hearing device of claim 14, wherein the second direction is at an angle relative to the first direction, the angle being 90° +/−30°.

22. The hearing device of claim 14, wherein the first and second segments are displaced with respect to each other along the reference axis.

23. A hearing device for placement in an ear of a user, the hearing device comprising:
at least one input transducer;
an output transducer;
a wireless communication unit and an antenna arrangement configured to provide a wireless link; and
a reference axis, the reference axis being parallel to an ear-to-ear axis of the user when the hearing device is placed in an operable position;
wherein the antenna arrangement comprises:
a first antenna configured for EM-radiation transmission and EM-radiation reception at a first frequency, the first antenna comprising a first electrically conducting segment extending in a first direction;
a second antenna configured for EM-radiation transmission and EM-radiation reception at the first frequency, the second antenna comprising a second electrically conducting segment extending in a second direction, the second direction being different from the first direction;
a first feed coupling the first antenna to the wireless communication unit, and
a second feed coupling the second antenna to the wireless communication unit;
wherein the first segment forms a part of a first loop, and/or wherein the second segment forms a part of a second loop.

24. The hearing device of claim 23, wherein one or each of the first loop and the second loop is a square loop.

25. The hearing device of claim 24, wherein the square loop has four sides of substantially equal length.

26. The hearing device of claim 24, wherein the square loop has a substantially equal current distribution along the four sides when transmitting.

27. A hearing device for placement in an ear of a user, the hearing device comprising:
at least one input transducer;
an output transducer;
a wireless communication unit and an antenna arrangement configured to provide a wireless link; and
a reference axis, the reference axis being parallel to an ear-to-ear axis of the user when the hearing device is placed in an operable position;
wherein the antenna arrangement comprises:
a first antenna configured for EM-radiation transmission and EM-radiation reception at a first frequency, the first antenna comprising a first electrically conducting segment extending in a first direction;
a second antenna configured for EM-radiation transmission and EM-radiation reception at the first frequency, the second antenna comprising a second electrically conducting segment extending in a second direction, the second direction being different from the first direction;
a first feed coupling the first antenna to the wireless communication unit, and
a second feed coupling the second antenna to the wireless communication unit:
wherein one or each of the first antenna and the second antenna comprises multiple tuning caps;
wherein the first segment forms a part of a first loop, and/or wherein the second segment forms a part of a second loop, and wherein the multiple tuning caps are distributed along a length of the first loop, along a length of the second loop, or along a combined length of the first and second loops.

* * * * *